United States Patent [19]

Hauris et al.

[11] Patent Number: 5,517,498
[45] Date of Patent: May 14, 1996

[54] SPATIAL REUSE OF BANDWIDTH ON A RING NETWORK

[75] Inventors: Jon F. Hauris, Manassas; Ronald A. Bowen, Sterling, both of Va.

[73] Assignee: International Business Machines Corporation, Armonk, N.Y.

[21] Appl. No.: 123,780

[22] Filed: Sep. 20, 1993

[51] Int. Cl.⁶ ......................................................... H04J 1/00
[52] U.S. Cl. ............................. 370/71; 359/119; 370/124
[58] Field of Search .................................. 370/16.1, 69.1, 370/71, 124, 85.7, 85.12, 85.15, 31; 455/5.1, 6.1, 34.1, 49.1, 53.1, 57.1; 359/115, 118, 119, 124, 125; 340/825.05

[56] References Cited

U.S. PATENT DOCUMENTS

| | | | |
|---|---|---|---|
| 4,521,881 | 6/1985 | Stapleford et al. | 370/124 |
| 4,698,802 | 10/1987 | Goke et al. | 370/60.1 |
| 4,701,904 | 10/1987 | Darcie | 359/119 |
| 4,731,785 | 3/1988 | Ferenc et al. | 370/60 |
| 4,759,011 | 7/1988 | Hicks, Jr. | 359/119 |
| 4,858,232 | 8/1989 | Diaz et al. | 370/58.3 |
| 4,879,714 | 11/1989 | Maeno | 370/85.7 |
| 4,897,841 | 1/1990 | Gang, Jr. | 370/85.13 |
| 4,905,231 | 2/1990 | Leung et al. | 370/94.1 |
| 5,101,290 | 3/1992 | Eng et al. | 370/73 |

FOREIGN PATENT DOCUMENTS 0227852 12/1985 European Pat. Off. .

*Primary Examiner*—Benedict V. Safourek
*Attorney, Agent, or Firm*—Lauren C. Bruzzone; Kenneth A. Seaman

[57] ABSTRACT

The invention provides a method and apparatus by which the usage of an existing ring network is extended by implementing spatial reuse of the network bandwidth. By spatial reuse we mean that specific portions of the ring network may reuse the same bandwidth. Essentially, the invention is based on the realization that each station rarely needs to communicate with all the other stations that share its ring. Under normal conditions, a station requires the ability to send messages only to a subgroup of the total number of stations. If the ring network is thought of as a circle and if the communicating stations are contiguous, then these stations occupy only an arc on the circle. Outside this arc, the bandwidth assigned to these stations is not in use. Accordingly, the bandwidth can be reassigned to stations which form other, non-overlapping arcs.

7 Claims, 4 Drawing Sheets

SPATIAL REUSE OF BANDWIDTH ON A RING NETWORK

FIELD OF INVENTION

This invention relates to the area of extending the capabilities of existing networks. More specifically, the invention relates to a method and apparatus design to extend the use of a network's bandwidth, thus permitting many more users to be active on a network.

PRIOR ART

Communication networks in use today (for example, Local Area Networks, LANs, etc.) are designed to operate at a specific bandwidth. For example, Ethernet operates at 10 Mbps (Megabits per second), Token Ring operates at 16 Mbps, and FDDI operates at 100 Mbps.

Even at the high end of the scale, however, a significant problem is presented when such existing networks are asked to carry multimedia communications. Most existing networks were designed for use in "mono-media" communications: that is, they were designed to transmit only one type of data such as voice transmission over a phone line or data transmission to a terminal. In today's multimedia applications, different types of data are integrated in one communications session. Where the applications include data transmission which require high data rates (such as video conferencing, HDTV, high resolution medical imaging and/ or graphics, animation, scientific visualization, or even multiple voice and sound combinations), a small number of users can easily use most of the available bandwidth on an existing LAN. Once the network bandwidth is used up, no additional users can participate on the LAN. As a result, a small number of users can essentially block any other LAN sessions from being established.

An illustration may prove useful. In ring networks, real-time, isochronous information (such as moving images and voice) is allocated on a channel basis. For example in FDDI II, the 100 Mbps bandwidth can be divided into 1536–64 Kbps channels or any combination of these channels. By way of illustration consider an FDDI II ring network, with 20 attached stations (as is depicted in FIG. 1), each assigned a 20 Mbps channel. Under normal operation these 20 stations would require 400 Mbps (20 stations× 20 Mbps per station) worth of bandwidth. Since FDDI II is only 100 Mbps, these 20 stations could not all operate simultaneously on the network. In fact, if stations 1,2,3, and 4 established a session, they would require a 80 Mbps channel, essentially blocking any other session.

One solution to this problem would be to install more LANs, with fewer users on each LAN. This, however, has the drawback of additional cost (due to duplicated facilities) and the loss of the advantage of having a specific group of users on a single LAN.

These drawbacks and disadvantages could be avoided if a way could be found to extend the usage of the existing network bandwidth. Extending the usage of a network's bandwidth would permit many more users to be active on the network at any one time. In effect, this, would increase the capacity of the network. To be more specific, suppose that the effective bandwidth of a FDDI network was increased from 100 Mbps to 500 Mbps, then fives times the information could be carried over the network, or five times the number of users could log onto the network.

While extending the usage of the existing network has the benefits both of avoiding costly, duplicate installation and extending the life of existing networks, for optimal benefit, it is imperative than any solution to the problem also avoid any change to the physical layer signaling used on the network. That is, since the physical layer signaling is specified and standardized by the national standards organizations (e.g. ANSI, IEEE, or CCITT), any solution which required changes would have drawbacks that could outweigh any bandwidth advantage. In short, any solution that is to bring any real benefit would have to retain the compatibility of the extended network to existing networks both at a hardware level and at a low layer (OSI layer 1, 2, and 3) software layer. This means that an optimal solution would need to extend this bandwidth for existing networks by primarily modifying the manner in which the network bandwidth is allocated, utilized, and managed.

OBJECTS OF THE INVENTION

It is accordingly an object of this invention to provide a method and apparatus that provides for efficient transmission of multimedia communications among a plurality of users over existing networks.

It is a further object of this invention that the effective bandwidth of such network be expanded to allow for the simultaneous use of the network by more users.

It is a further object of this invention to provide the bandwidth expansion while retaining physical layer signaling of the existing network and compatibility to existing networks at both the hardware and software layer.

SUMMARY OF THE INVENTION

The present invention overcomes the above described problems and deficiencies of the prior art and achieves technical advance by providing an improved method of allocating bandwidths within a ring network. More particularly, the present invention provides an advance over currently implemented methods by more efficiently utilizing channels within the bandwidth of a network by allowing a single channel to be used by multiple sets of contiguous stations.

The solution to extending the usage of an existing ring network is achieved by implementing spatial reuse of the network bandwidth. By spatial reuse we mean that specific portions of the ring network may reuse the same bandwidth. Essentially, the invention is based on the realization that each station rarely needs to communicate with all the other stations that share its ring. Under normal conditions, a station requires the ability to send messages only to a subgroup of the total number of stations. If the ring network is thought of as a circle and if the communicating stations are contiguous, then these stations occupy only an arc on the circle. Outside this arc, the bandwidth assigned to these stations is not in use. Accordingly, the bandwidth can be reassigned to stations which form other, non-overlapping arcs.

DETAILED DESCRIPTION OF THE INVENTION

Figure 1:
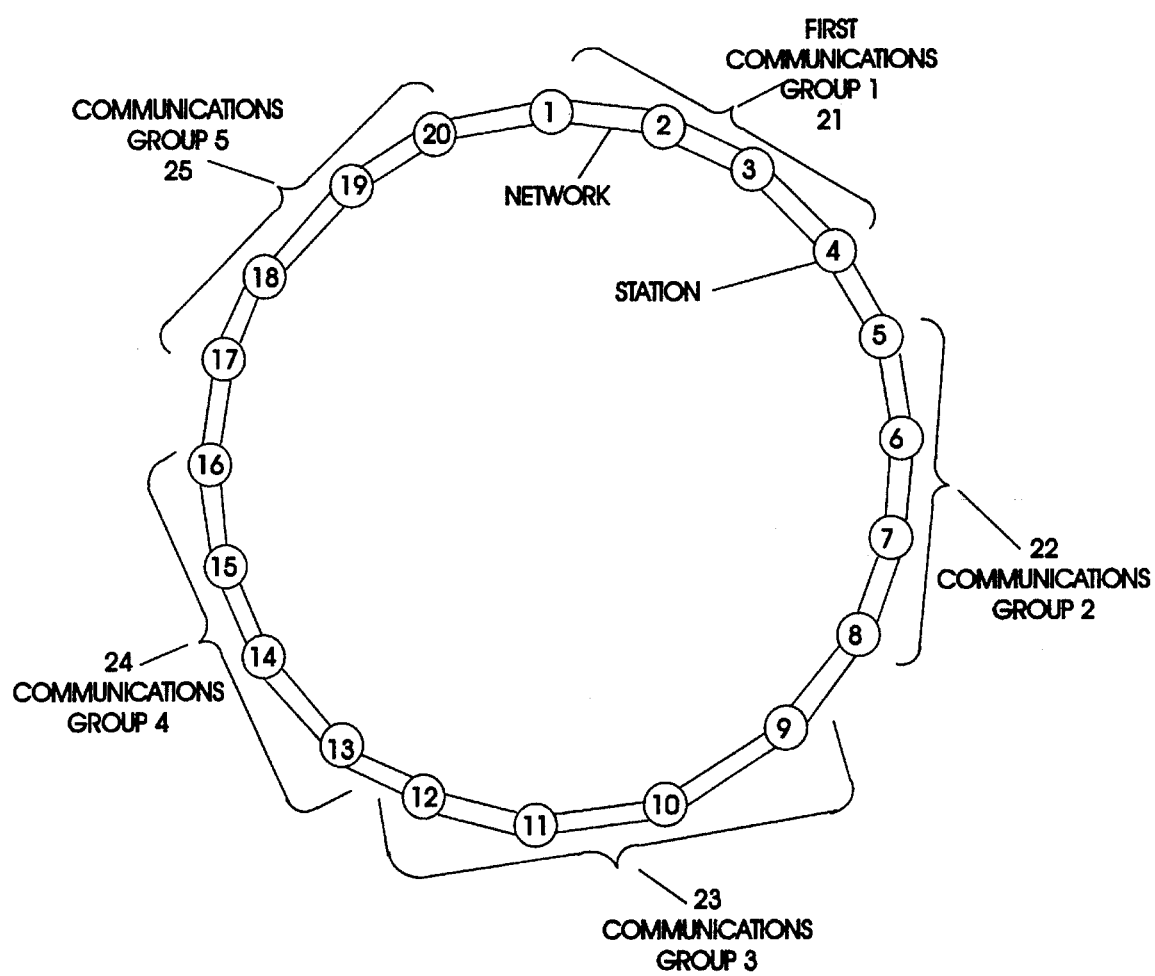
FIG. 1 is a graphical representation of a FIDI II ring network with 20 stations divided into five linearly distributed communications groups.

The present invention will be discussed as embodied on a full duplex FDDI II ring network having a 100 Mbps bandwidth. The ring network has 20 attached stations, each requiring a 20 Mbps channel. This is depicted graphically in FIG. 1. In the preferred embodiment, the ring network is comprised of a dual Media Access Control (MAC) FDDI II network.

In ring networks such as the one described above, real-time, isochronous information (such as moving images and voice) is allocated on a channel basis. In the FDDI II network in question,, the 100 Mbps bandwidth can be divided into 1536–64 Kbps channels or any combination of these channels. Since each of the 20 attached stations required a 20 Mbps channel, in the prior art a total of 400 Mbps (20 stations×20 Mbps per station) worth of bandwidth is needed for the stations to communicate with each other. Since FDDI II is only 100 Mbps, these 20 stations could not all operate simultaneously on the network.

It should be noted, however, that in practice, each station does not have a need to communicate to each of the other 19 stations simultaneously. Rather, a station will normally require communication which some subgroup of the total. This fact opens up the possibility of assigning a portion of the bandwidth to a group of stations, and then reassigning the bandwidth to another group. The method by which this is accomplished, referred to as spacial reuse, is described in more detail below.

The simplest implementation of spacial reuse occurs when the groups of stations on a ring network that wish to communicate with each other form contiguous, non-overlapping subgroups. This will be referred to as linearly distributed groups. For example, in the ring network of FIG. 1, the communications requirements of the station could essentially divide the ring into five linearly distributed communications groups: communication group 1, comprised of stations 1–4, (21); communication group 2, comprised of stations 5–8 (22); communication group 3, comprised of stations 9–12 (23); and communications group 4, comprised of stations 13–16 (24); and communications group 5, comprised of stations 17–19 (25). (Note that the stations in each group are contiguous: that is, if the first station x and last station y in a group G are considered the end points of an arc on the circle formed by the ring network, each station lying on that arc —or between station x and station y—belongs to group G. In contrast, in the communications group formed of the stations 1, 2, 4, the stations are not contiguous and hence this group would not be linearly distributed.)

Were unlimited bandwidth available, if each station required 20 Mbps, then each group would be assigned one of Channels A through E, each having an allocated bandwidth of 80 Mbps. This is shown in Table 1. Using the concept of spacial reuse of the present invention, however, each of the five groups is reallocated the same channel S at 80 Mbps. (This is shown in Table 2.) Because each group is full duplex and contains its communication only within its own group, the channel is free for reuse outside of the spatial group.

More particularly, assume channel S is comprised of the bands from 20 to 100 Mbps, and further assume that station 6 needs to send message 2 to station 7, within communication group 2; station 9 needs to send message 3b to station 12 within communication group 3; and station 10 needs to send message 3a to station 11 in communication group 3. Station 6 will use 40– 60 Mbps, station 9 will use 20–40 Mbps, and station 10 will use 40–60 Mbps. Thus, reuse will occur for the bandwidth assigned to station 6 and station 10.

Figure 3:
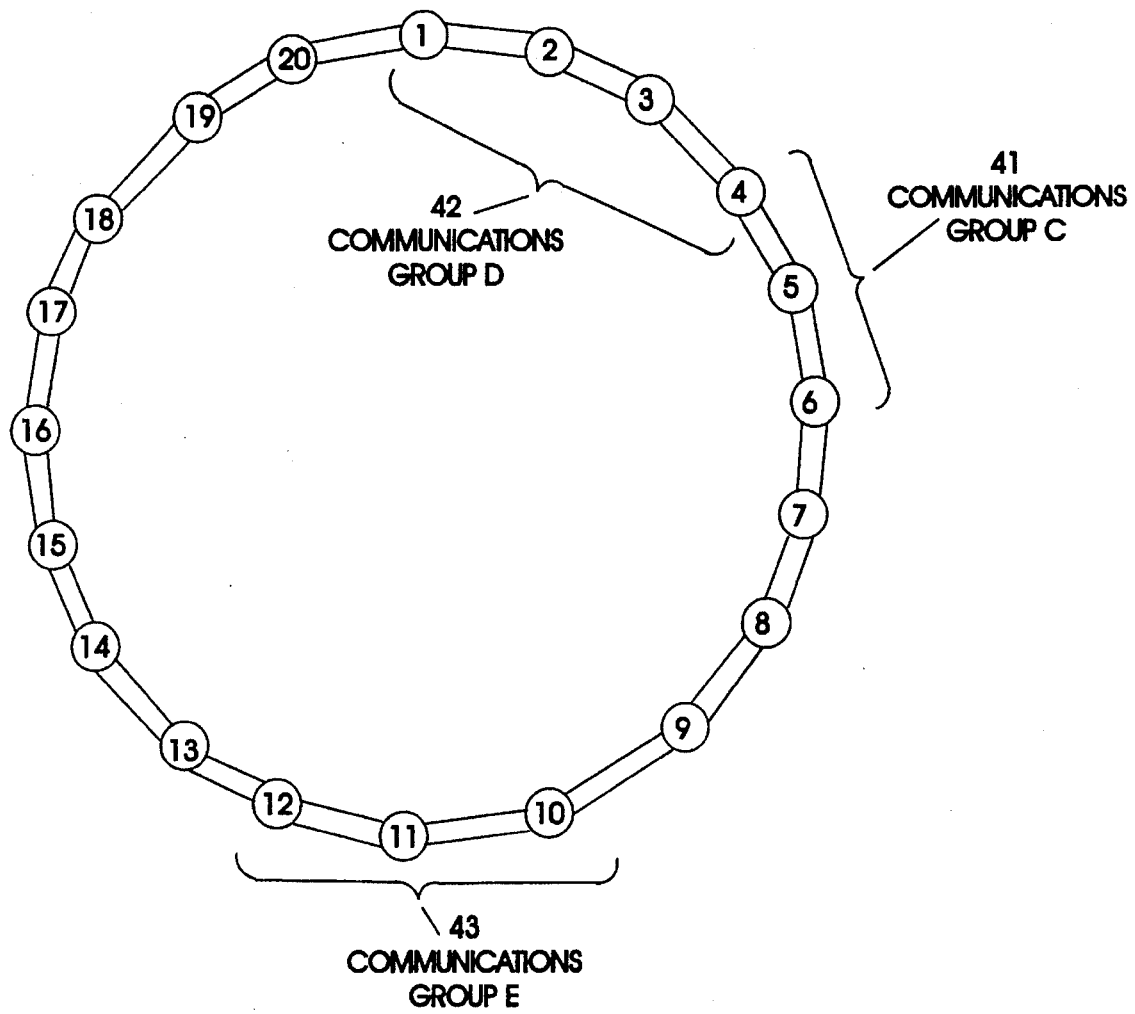
FIG. 3 is a graphical representation of a FIDI II ring network with 20 stations with two cross-boundary nested communications groups and an independent communications group.

The details of the operation are as follows. Station 6 will send message 2 to station 7, occupying the clockwise bandwidth 40–60 Mbps as the message travels between station 6 and station 7. Station 7 receives the message. At this point, data in 40– 60 Mbps is no longer required. This bandwidth is then free for Station 10 (which is "further down the line" on the ring network in terms of data traffic proceeding counterclockwise) to use to send its message to station 11. In the meantime, station 9 uses 20–40 Mbps to communicate with station 12. The bandwidth is not required once the traffic passes station 12, hence, station 13 can make use of it if it wishes to communicate with any of the other stations in communication group 4. This utilization is shown in FIG. 3.

For an originating station requiring communications with a station in its subgroup situated in a counter-clockwise direction from it (in FIG. 1, this is equivalent to a station in a subgroup with a lower number than the originating station), the bandwidth moving in the counterclockwise direction is used.

A somewhat more complex situation occurs when the communication groups are "nested." Generally, two types of nesting can occur: regular nesting and cross boundary nesting.

Figure 2:
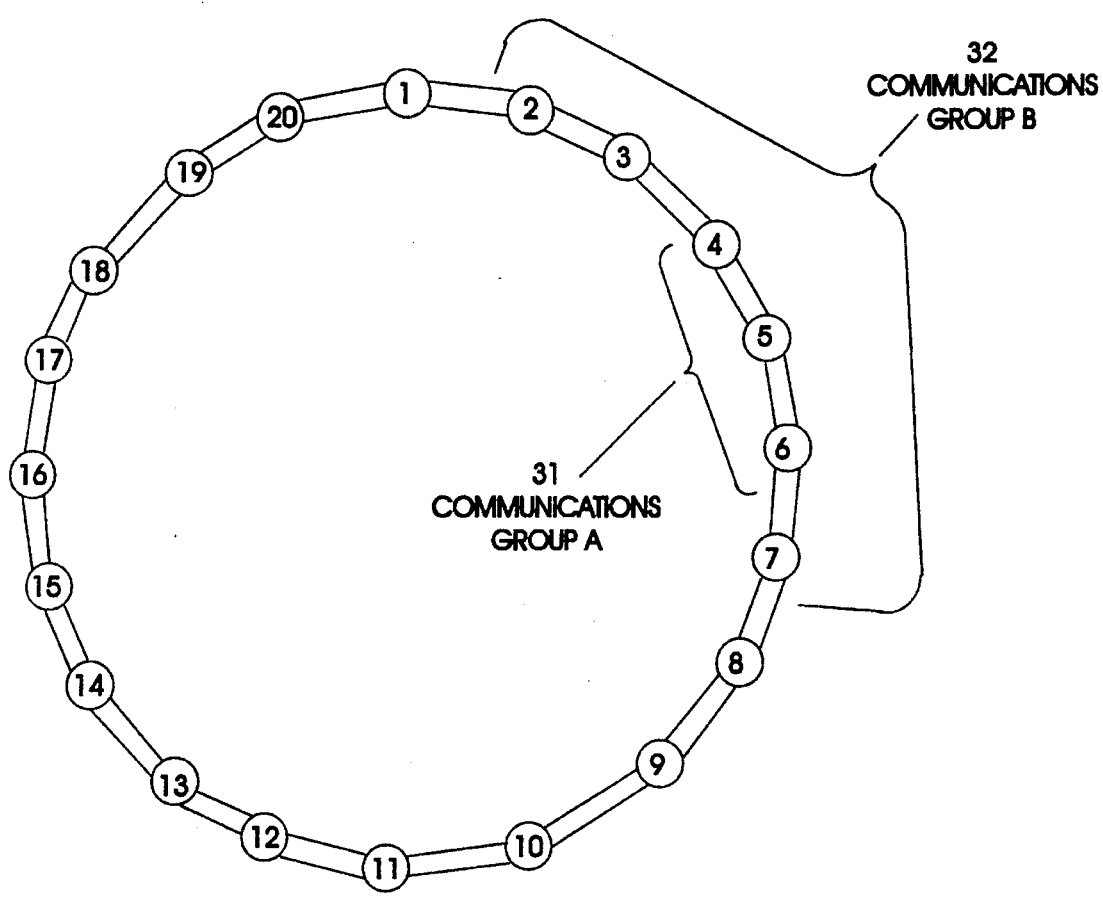
FIG. 2 is a graphical representation of a FIDI II ring network with 20 stations with two regularly nested communications groups.

Regular nesting (or just nesting) occurs when one group of stations is spatially located entirely within another group. For example, assuming stations are sequentially numbered clockwise, the Communication Group A consisting of stations 4–5 and 6, is nested within the Communication Group B consisting of stations 1,2,3,4,5,6 and 7. In this situation, as graphically depicted in FIG. 2, Communication Group A (31) is nested within Communication Group B (32).

Cross boundary nesting (or cb nesting) occurs when two groups partially overlap so that one group extends across the boundary of the other. Referring to FIG. 3, Communication group C (41) consisting of stations 4, 5 and 6 is cb-nested in the Communication Group D (42) consisting of stations 1,2, 3 and 4.

Communications groups which do not overlap with any other group are referred to as independent groups. For example, referring to FIG. 3, Communication Group E (43), consisting of stations 10, 11, and 12, is independent of Communication Groups C and D.

Figure 4:
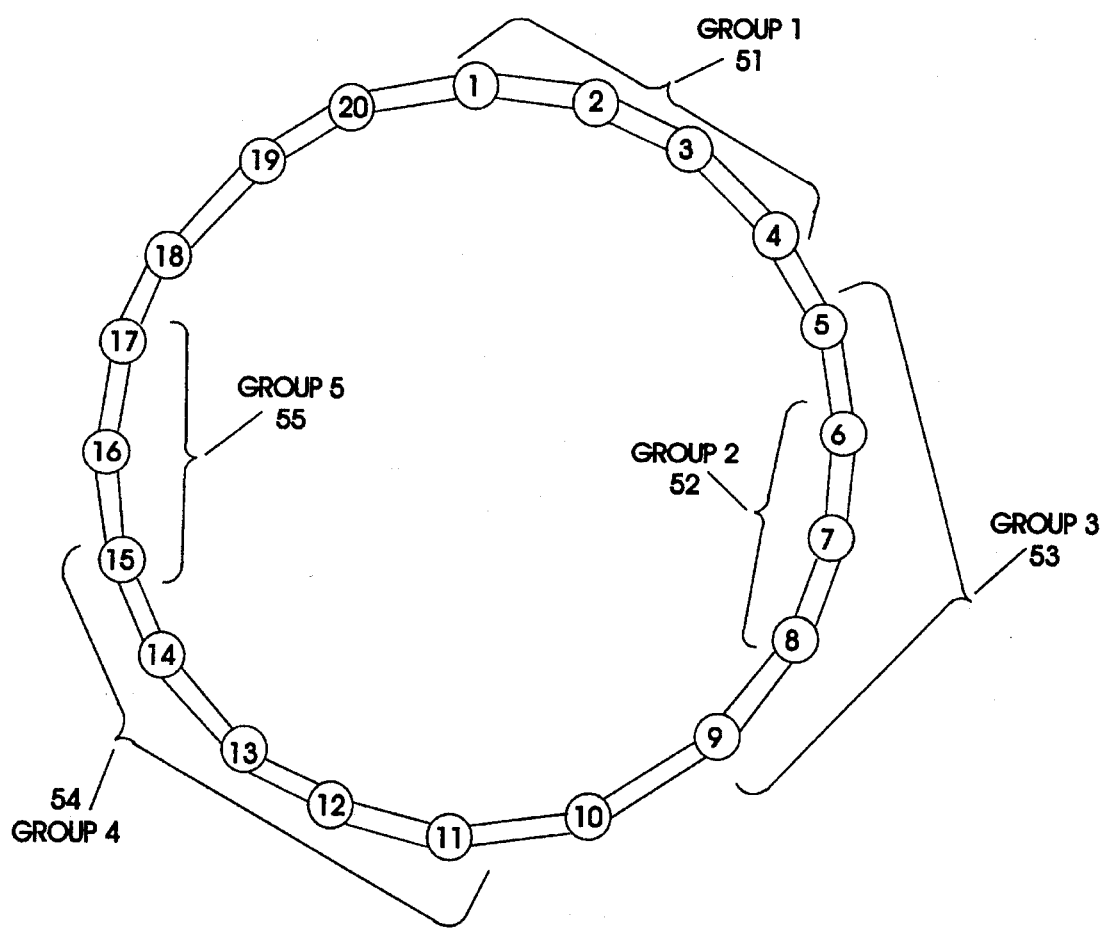
FIG. 4 is a graphical representation of a FIDI II ring network with 20 stations with five linearly distributed communications groups, two of which are nested and two of which are cross-boundary nested.

The operation of the invention in a nesting situation is as follows. Consider a configuration of five groups depicted in FIG. 4: group 1 (51) is independent; group 2 (52) is nested entirely within group 3 (53); and finally group 4 (54) and group 5 (55) are cb nested. In this configuration, under spacial reuse, channel S will be allocated to groups 1, 2, and 4. These groups can be allocated the same channel because they are independent of each other. Groups 3 and 5 can then also be allocated their own separate channel T because they are independent of each other. They must be assigned a different channel than the other groups because they are not independent (nesting wise) of the other groups. Also, groups 1, 2, and 4 all reuse the same channel because they are nest-wise independent. The same holds for groups 3 and 5. The stations of each group and their channel allocations are shown in Table 3.

In the case of a non-contiguous communications group N, it can be observed that the invention may also be used provided those stations which, if included in group N would make N contiguous, are not required to be in another communication group. In essence, they are included in communications group N to make it linearly distributed.

In order to implement the spatial reuse concept on a ring network like FDDI, a management agent software would have to keep a logical and physical ring map (which is part of the FDDI standards) and would have to allocate the channels based on spatial grouping. This algorithm would have to determine the physical ring map, determine the spatial groupings, determining the nesting between the groupings, and allocate the channels based on the independent groups. (In this context, independent refers to groups that are not nested.) It can be observed that if there are no nested groups then all groups may be assigned the same single channel. For each nesting of groups an additional channel allocation will have to be provided (one for each nest and/or each level of nesting). Thus it can be seen that by using spatial reuse, the bandwidth of a ring network can be enormously extended.

Although the implementation of the invention has been disclosed within the context of a FIDI II ring network, the invention can also find application in any ring-topology network.

Although a specific embodiment of the invention has been disclosed, it will be understood by those having skill in the art that changes can be made in the specific embodiment disclosed, without departing from the spirit and scope of the invention.

TABLES

TABLE 1

Prior Art

| GROUP | Channel | Additional Bandwidth Allocated (Mbps) |
|---|---|---|
| 1. 1–4 | A | 80 |
| 2. 5–8 | B | 80 |
| 3. 9–12 | C | 80 |
| 4. 13–16 | D | 80 |
| 5. 17–20 | E | 80 |
| | | Total Allocation: 400 Mbps |

TABLE 2

| GROUP | Channel | Additional Bandwidth Allocated (Mbps) |
|---|---|---|
| 1. 1–4 | S | 80 |
| 2. 5–8 | S | / |
| 3. 9–12 | S | / |
| 4. 13–16 | S | / |
| 5. 17–20 | S | / |
| | | Total Allocation: 80 Mbps |

TABLE 3

| GROUP | Channel | Additional Bandwidth Allocated (Mbps) |
|---|---|---|
| 1. 1–4 | S | 80 |
| 2. 6–8 | S | / |
| 3. 5–9 | T | 80 |
| 4. 11–15 | S | / |
| 5. 15–17 | T | / |
| | | Total Allocation: 160 Mbps |

We claim:

1. A method of extending the effective bandwidth of a ring network connecting a plurality of stations connected one to the next comprised of the steps of:

a. identifying a plurality of communication groups, each communication group comprised of at least two stations on a ring network and each of the communication groups being such that
no station is shared by any two groups; and b. selecting a first communication group of said plurality of communication groups and assigning it a first band;

c. using said first band to transmit a first message from a first station in said first communication group to a second station in said first communication group;

d. selecting a second communication group of said plurality of communication groups; and e. using said first band to transmit a second message from a first station in said second group to a second station in said second group.

2. A method as in claim 1 which is further comprised of:

a. identifying a third and fourth communication group, said third and fourth communication groups having no station in common with said first and second communication groups, such that said third and fourth communication groups have at least one station in common, said third communication group has at least one station which is not in said fourth communication group and said fourth communication group has at least one station which is not in said third group;

b. using said first band to transmit a third message from a first station in said third communication group to a second station in said third communication group; and c. using a second band to transmit a fourth message from a first station in said fourth communications group to a second station in said fourth communications group.

3. A method as in claim 1 which is further comprised of:

a. using a dual-direction band in said ring network, having a first, clockwise direction and a second, counterclockwise direction;

b. using said clockwise direction of said band if said second station in said first group is located clockwise from said first station in said first group; and c. using said counterclockwise direction of said band if said second station in said first group is located counterclockwise from said first station in said first group.

4. A method as in claim 1 wherein all stations are contiguous.

5. A method of extending the effective bandwidth of a ring network connecting a plurality of stations connected one to the next, comprised of the steps of:

a. identifying a plurality of communications groups, each communication group comprised of at least two stations on a ring network and each of the communications groups being such that all stations within each group are contiguous;

b. selecting a first communication group and a second communication group such that said first communication group share no station with said second communication group;

c. selecting a third communication group such that each station in said third communication group is also in said first communication group;

d. assigning said first communication group a first band;

e. assigning said third communication group a second band;

f. using said first band to transmit a first message from a first station in said first group to a second station in said first group;

g. using said second band to transmit a third message from a first station in said third group to a second station in said third group;

h. using said first band to transmit a second message from a first station in said second group to a second station in said second group.

6. A method as in claim 5 which is further comprised of:

a. identifying a fourth and fifth communication group, said fourth and fifth communication groups having no station in common with said first, second, and third communication groups, such that said fourth and fifth communication groups have at least one station in common, said fourth communication group has at least one station which is not in said fifth communication group and said fifth communication group has at least one station which is not in said fourth group;

b. using said first band to transmit a fourth message from a first station in said fourth communication group to a second station in said fourth communication group; and c. using said second band to transmit a fifth message from a first station in said fifth communications group to a second station in said fifth communications group.

7. A method as in claim 5 which is further comprised of:

a. using a dual-direction band in said ring network, having a first, clockwise direction and a second, counterclockwise direction;

b. using said clockwise direction of said band if said second station in said first group is located clockwise from said first station in said first group; and c. using said counterclockwise direction of said band if said second station in said first group is located counterclockwise from said first station in said first group.

\* \* \* \* \*